(12) United States Patent
Ichida et al.

(10) Patent No.: US 8,998,756 B2
(45) Date of Patent: Apr. 7, 2015

(54) APPARATUS FOR ADJUSTING A POSITION OF A BICYCLE DERAILLEUR

(75) Inventors: Tadashi Ichida, Ikoma (JP); Kazuhiro Fujii, Kawachinagano (JP); Ryuichiro Takamoto, Sakai (JP); Haruyuki Takebayashi, Yao (JP)

(73) Assignee: Shimano, Inc., Sakai, Osaka (JP)

( * ) Notice: Subject to any disclaimer, the term of this patent is extended or adjusted under 35 U.S.C. 154(b) by 1343 days.

(21) Appl. No.: 10/907,544

(22) Filed: Apr. 5, 2005

(65) Prior Publication Data
US 2005/0227798 A1    Oct. 13, 2005

(30) Foreign Application Priority Data

Apr. 8, 2004 (JP) .................. 2004-113917

(51) Int. Cl.
| F16H 9/00 | (2006.01) |
| B62M 25/08 | (2006.01) |
| B62K 23/06 | (2006.01) |
| B62M 25/04 | (2006.01) |
| B62M 25/00 | (2006.01) |

(52) U.S. Cl.
CPC .............. B62M 25/08 (2013.01); B62K 23/06 (2013.01); B62M 25/045 (2013.01); B62M 2025/003 (2013.01)

(58) Field of Classification Search
USPC ........................ 474/80, 82, 81, 70
See application file for complete search history.

(56) References Cited

U.S. PATENT DOCUMENTS

| 3,919,891 A * | 11/1975 | Stuhlmuller et al. ............ 474/70 |
| 4,384,864 A * | 5/1983 | Bonnard ........................ 474/82 |
| 4,490,127 A * | 12/1984 | Matsumoto et al. .......... 474/110 |
| 4,833,937 A * | 5/1989 | Nagano .................... 74/501.5 R |
| 5,059,158 A * | 10/1991 | Bellio et al. ...................... 474/70 |
| 5,213,549 A | 5/1993 | Blanchard |
| 5,254,044 A * | 10/1993 | Anderson ....................... 474/70 |
| 5,357,177 A * | 10/1994 | Fey et al. ........................ 318/3 |
| 5,470,277 A * | 11/1995 | Romano ......................... 474/70 |
| 5,494,307 A | 2/1996 | Anderson |
| 5,571,056 A * | 11/1996 | Gilbert .......................... 474/80 |
| 5,599,244 A * | 2/1997 | Ethington ...................... 474/70 |
| 5,681,234 A * | 10/1997 | Ethington ...................... 474/70 |
| 5,728,017 A * | 3/1998 | Bellio et al. .................... 474/70 |
| 5,803,848 A * | 9/1998 | Nier ............................... 474/81 |
| 6,047,230 A * | 4/2000 | Spencer et al. ................. 701/57 |
| 6,132,327 A * | 10/2000 | Campagnolo ................. 474/80 |
| 6,244,415 B1 * | 6/2001 | Fujii ............................ 192/217 |
| 6,277,044 B1 | 8/2001 | Fujimoto |
| 6,418,368 B2 * | 7/2002 | Jinbo et al. ..................... 701/70 |

(Continued)

FOREIGN PATENT DOCUMENTS

DE    196 40 681 A1    4/1998
EP    1359088 A2 *   11/2003

*Primary Examiner* — Robert A Siconolfi
*Assistant Examiner* — Mahbubur Rashid
(74) *Attorney, Agent, or Firm* — James A. Deland

(57) ABSTRACT

A bicycle transmission control apparatus comprises a control unit that provides a first signal to operate a first derailleur a gear shift distance from a first origin sprocket to a first destination sprocket. The control unit receives a condition signal that indicates a condition resulting from at least one of the first derailleur and a second derailleur; and an adjustment controller moves the first derailleur an adjustment distance less than the gear shift distance in response to the condition signal.

27 Claims, 14 Drawing Sheets

(56) References Cited

U.S. PATENT DOCUMENTS

| | | |
|---|---|---|
| 7,159,881 B2 | 1/2007 | Guderzo et al. |
| 7,630,810 B2 | 12/2009 | Guderzo |
| 2001/0030408 A1* | 10/2001 | Miyoshi ........................ 280/276 |
| 2002/0128097 A1* | 9/2002 | Takebayashi ................... 474/58 |
| 2003/0160420 A1* | 8/2003 | Fukuda ......................... 280/260 |
| 2004/0005947 A1* | 1/2004 | Shahana et al. ................. 474/78 |
| 2004/0051273 A1* | 3/2004 | Fujii ............................. 280/260 |
| 2004/0108680 A1* | 6/2004 | Guderzo et al. .............. 280/260 |

* cited by examiner

APPARATUS FOR ADJUSTING A POSITION OF A BICYCLE DERAILLEUR

BACKGROUND OF THE INVENTION

The present invention is directed to bicycles and, more particularly, to an apparatus for adjusting a position of a bicycle derailleur.

Bicycle transmissions that comprise front and rear derailleurs are well known. The front derailleur shifts a chain among a plurality of front sprockets that are coaxially mounted to the pedal crank shaft, and the rear derailleur shifts the chain among a plurality of rear sprockets that are coaxially mounted to the rear wheel. It is also known to use electric motors to operate the front and rear derailleurs, wherein operating a button or lever on a shift control device mounted to the bicycle handlebar controls the motors. Such a system is shown in Japanese Patent Application No. 2002-87371.

The chain is oriented in very extreme angles when it engages the innermost front sprocket in combination with the outermost rear sprocket and when it engages the outermost front sprocket in combination with the innermost rear sprocket. Depending upon the design of the bicycle frame, such extreme angles may cause the chain to rub against the front derailleur cage. Even when the front derailleur is initially installed in a proper position, the derailleur may subsequently move over time, thereby again causing the chain to rub against the derailleur cage in such situations. Such contact causes noise, greater pedaling resistance, and excessive wear on the derailleur cage.

SUMMARY OF THE INVENTION

The present invention is directed to an apparatus for adjusting a position of a bicycle derailleur. In one embodiment, a bicycle transmission control apparatus comprises a control unit that provides a first signal to operate a first derailleur a gear shift distance from a first origin sprocket to a first destination sprocket. The control unit receives a condition signal that indicates a condition resulting from at least one of the first derailleur and a second derailleur; and an adjustment controller moves the first derailleur an adjustment distance less than the gear shift distance in response to the condition signal. Additional inventive features will become apparent from the description below, and such features alone or in combination with the above features may form the basis of further inventions as recited in the claims and their equivalents.

DETAILED DESCRIPTION OF THE EMBODIMENTS

Figure 1:
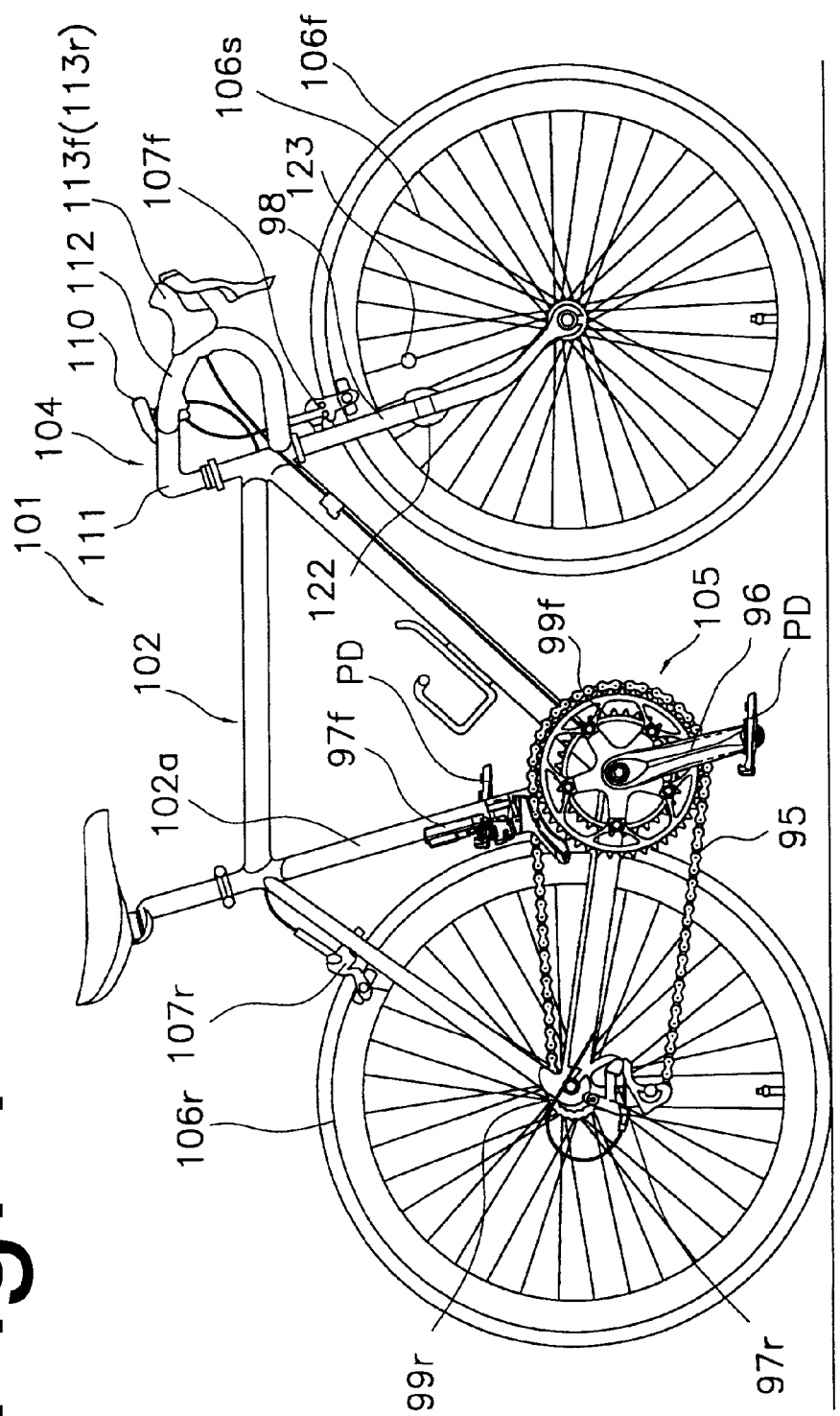
FIG. 1 is a side view of a particular embodiment of a bicycle.

FIG. 1 is a side view of a bicycle 101 that includes particular embodiments of electrically controlled components. Bicycle 101 is a road bicycle comprising a diamond-shaped frame 102, a front fork 98 rotatably mounted to frame 102, a handlebar assembly 104 mounted to the upper part of fork 98, a front wheel 106f rotatably attached to the lower part of fork 98, a rear wheel 106r rotatably attached to the rear of frame 102, and a drive unit 105. A front wheel brake 107f is provided for braking front wheel 106f, and a rear wheel brake 107r is provided for braking rear wheel 106r.

Figure 5:
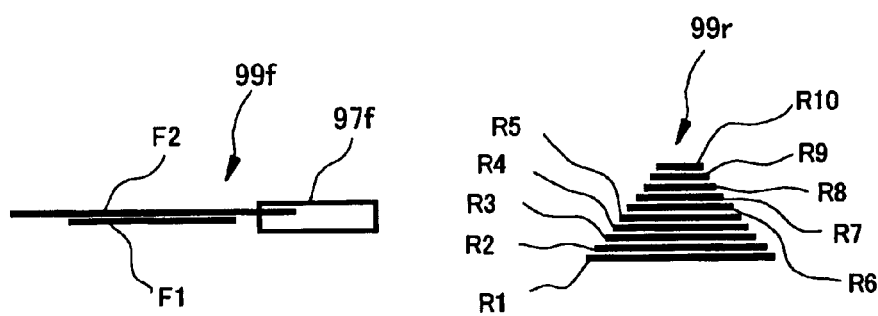
FIG. 5 is a schematic diagram of the front and rear sprocket assemblies.

Drive unit 105 comprises a chain 95, a front sprocket assembly 99f coaxially mounted with a crank 96 having pedals PD, an electrically controlled front derailleur 97f attached to a seat tube 102a of frame 102, a rear sprocket assembly 99r coaxially mounted with rear wheel 106r, and an electrically controlled rear derailleur 97r. As shown in FIG. 5, front sprocket assembly 99f comprises two coaxially mounted sprockets F1-F2, and rear sprocket assembly 99r comprises ten sprockets R1-R10 mounted for coaxial rotation with of rear wheel 106r. The number of teeth on the laterally innermost front sprocket F1 is less than the number of teeth on the laterally outermost front sprocket F2. The numbers of teeth on rear sprockets R1-R10 gradually decrease from the laterally inner most rear sprocket R1 to the laterally outermost rear sprocket R10. As a result, rear sprocket R1 has the greatest number of teeth, and rear sprocket R10 has the least number of teeth. Front derailleur 97f moves to two operating positions to switch chain 95 between front sprockets F1 and F2, and rear derailleur 97r moves to ten operating positions to switch chain 95 among selected ones of the rear sprockets R1-R10. A front gear position sensor 133f (FIG. 6) senses the operating position of front derailleur 97f, and a rear gear position sensor 133r senses the operating position of rear derailleur 97r. A battery or some other power source (not shown) powers front and rear derailleurs 97f and 97r as well as other electrical components described herein in a known manner.

Figure 2:
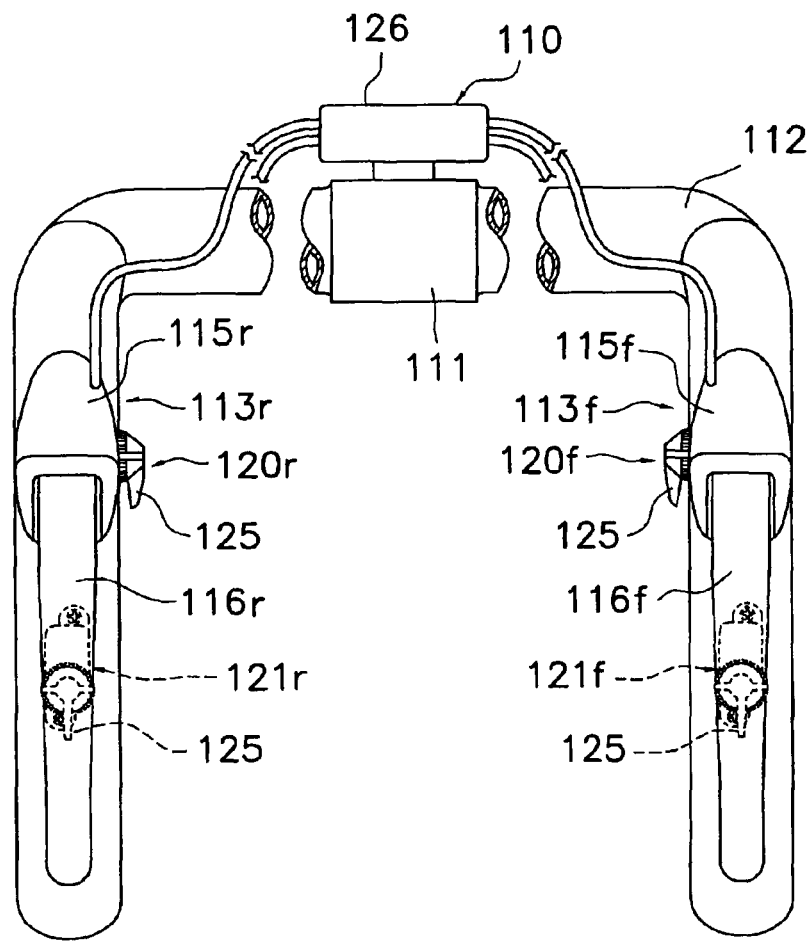
FIG. 2 is a front view of particular embodiments of brake lever assemblies mounted to the bicycle handlebar.

Handlebar assembly 104 comprises a handlebar stem 111 and a drop-style handlebar 112, wherein handlebar stem 111 is mounted to the upper part of fork 98, and handlebar 112 is mounted to the forward end portion of handlebar stem 111. As shown in FIG. 2, brake lever assemblies 113f and 113r are mounted at opposite sides of handlebar 112. Brake lever assembly 113f controls the operation of front wheel brake 107f, and brake lever assembly 113r controls the operation of rear wheel brake 107r. A derailleur control device 110 is mounted to a central portion of handlebar 112.

Figure 3:
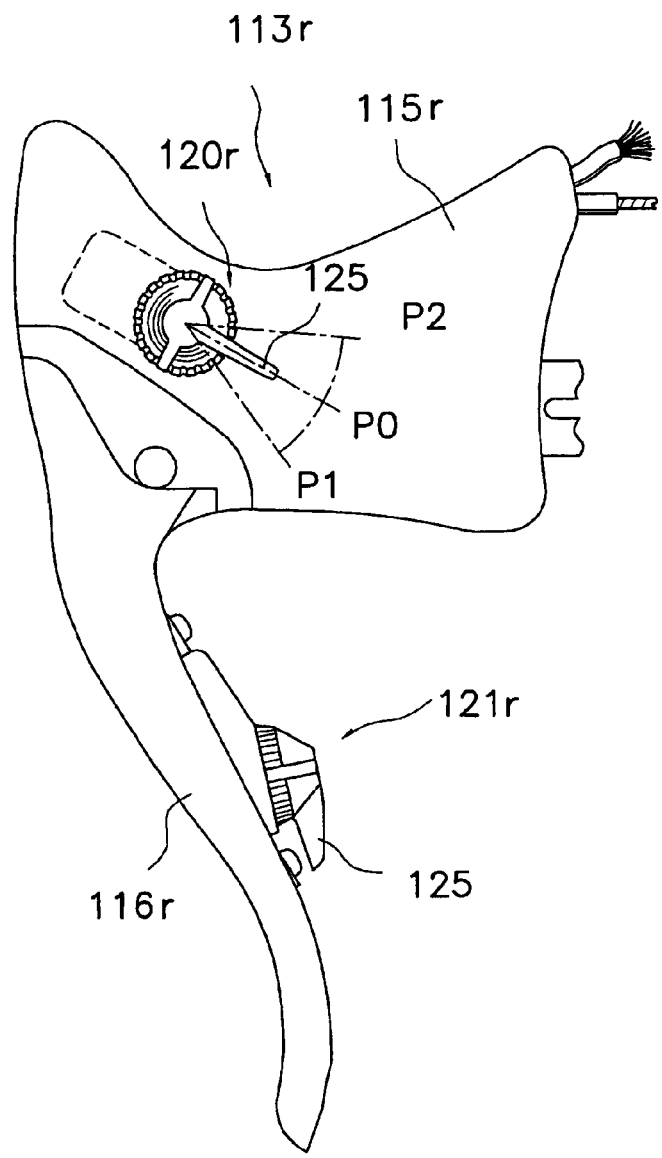
FIG. 3 is a side view of the rear brake lever assembly.
Figure 4:
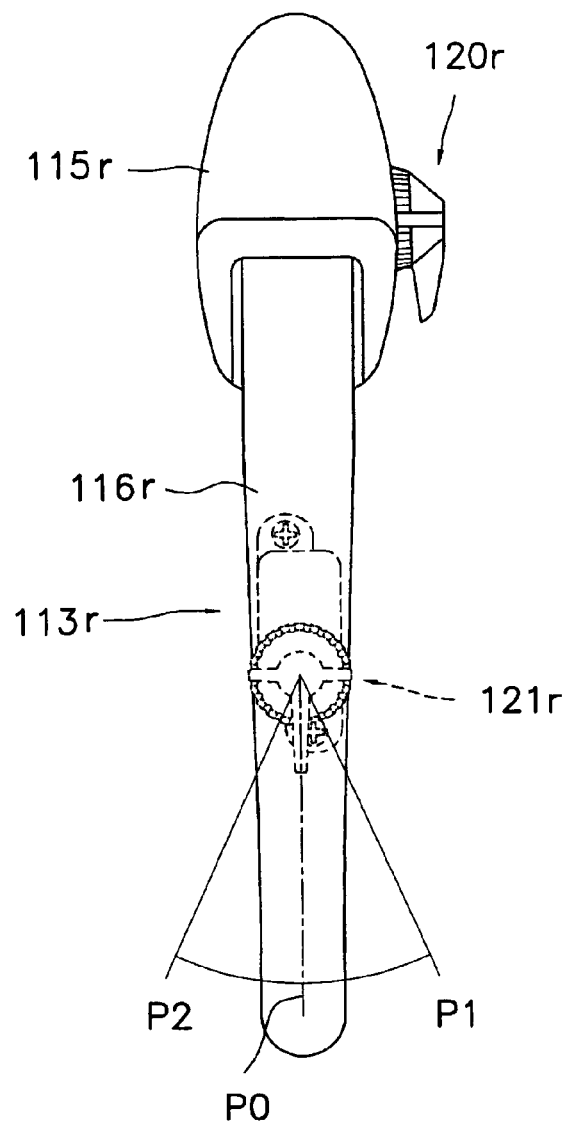
FIG. 4 is a front view of the rear brake lever assembly.

Brake lever assemblies 113f and 113r comprise respective brake brackets 115f and 115r mounted to the forward curved portions of handlebar 112, and brake levers 116f and 116r pivotably mounted to brake brackets 115f and 115r. Rear shift control devices 120r and 121r with switch levers 125 are mounted to the inner side of brake bracket 115r and to the rear side of brake lever 116r, respectively, to control the operation of rear derailleur 97r. In this embodiment, rear shift control devices 120r and 121r independently control the operation of rear derailleur 97r so that the rider may control the operation of rear derailleur 97r with the hand grasping brake bracket 115r or with the hand grasping brake lever 116r. As shown in FIG. 3, the switch lever 125 mounted to brake lever bracket 115r rotates downward from a home position P0 to a first position P1 and rotates upward from home position P0 to a second position P2 to control the operation of rear derailleur 97r. As shown in FIG. 4, the switch lever 125 mounted to the rear of brake lever 116r rotates laterally inward from a home position P0 to a first position P1 and rotates laterally outward from home position P0 to a second position P2 to control the operation of rear derailleur 97r. Similarly, independent front shift control devices 120f and 121f with switch levers 125 are mounted to the inner side of brake bracket 115f and to the rear side of brake lever 116f, respectively, to control the operation of front derailleur 97f. The switch levers 125 mounted to brake lever bracket 115f and brake lever 116f operate in the same manner as switch levers 125 mounted to brake lever bracket 115r and brake lever 116r. All of the switch levers 125 are biased toward the home position P0.

A front upshift switch 131f (FIG. 6) and a front downshift switch 132f are mounted in each front shift control device 120f and 121f. The front upshift switches 131f operate when switch levers 125 in front shift control devices 120f and 121f rotate from position P0 to position P1, and the front downshift switches 132f operate when switch levers 125 in front shift control devices 120f and 121f rotate from position P0 to position P2. Similarly, a rear upshift switch 131r and a rear downshift switch 132r are mounted in each rear shift control device 120r and 121r. The rear upshift switches 131r operate when switch levers 125 in rear shift control devices 120r and 121r rotate from position P0 to position P1, and the rear downshift switches 132r operate when switch levers 125 in rear shift control devices 120r and 121r rotate from position P0 to position P2. Of course, many different switch combinations that operate in many different ways may be provided to suit different applications.

Figure 6:
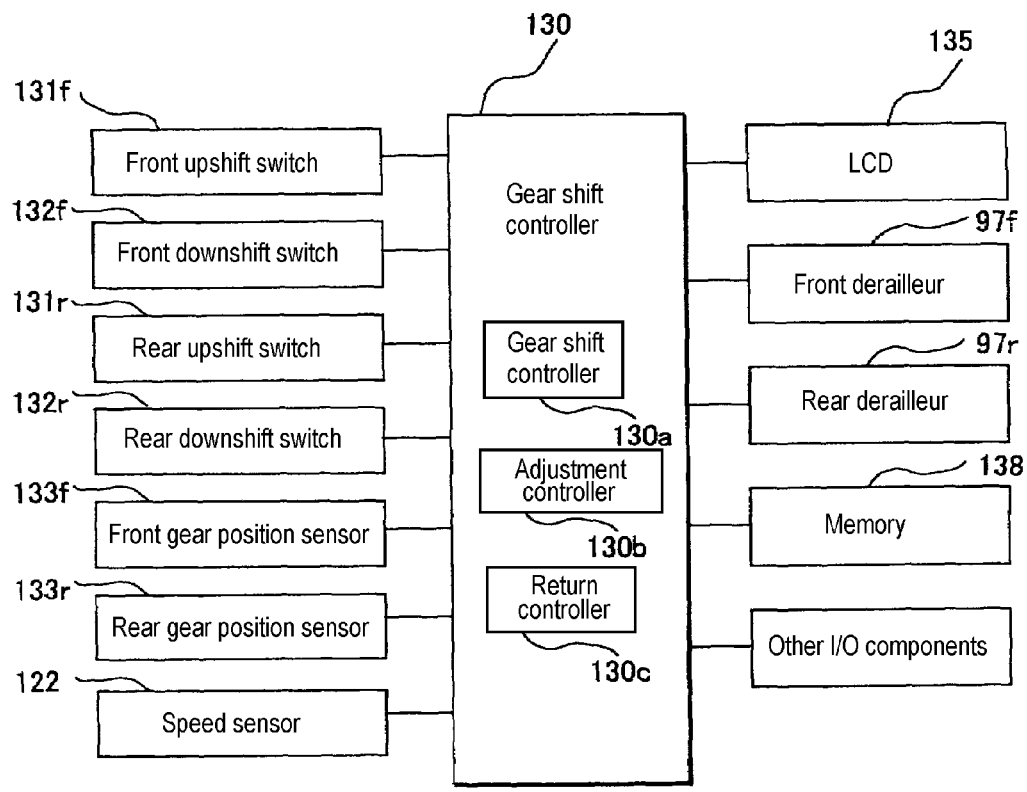
FIG. 6 is a schematic block diagram of a particular embodiment of a derailleur control apparatus.

As shown in FIGS. 2 and 6, derailleur control device 110 comprises a case 126 mounted onto the central portion of handlebar 112. Mounted within case 126 are a control unit 130 and a liquid crystal display (LCD) 135 for displaying riding parameters and other information. Front derailleur 97f, rear derailleur 97r, front upshift switch 131f, front downshift switch 132f, rear upshift switch 131r, rear downshift switch 132r, front gear position sensor 133f, rear gear position sensor 133r and other I/O units are connected to control unit 130 through appropriate methods such as wired or wireless devices. A storage unit such as a memory 138 stores various parameters used in the operation of control unit 130. For example, the operating (sprocket) positions (FP, RP) based on the front sprockets FS (S=1, 2) and rear sprockets RS (S=1-10) for the front and rear derailleurs 97f and 97r are stored in accordance with values detected by gear position sensors 133f and 133r. As shown in FIGS. 1 and 6, a speed sensor 122 is mounted to fork 98 to sense the passage of a magnet 123 mounted to a spoke 106s of front wheel 106f and to provide speed indicating signals to control unit 130 through a wired or wireless method.

In this embodiment, control unit 130 comprises a programmed microprocessor. Control unit 130 includes a gear shift controller 130a, an adjustment controller 130b and a return controller 130c. Gear shift controller 130a provides signals to control the operation of front derailleur 97f and rear derailleur 97r to shift chain 95 the distance from an origin sprocket to a destination sprocket in accordance with signals received from front and rear upshift switches 131f and 131r, front and rear downshift switches 132f and 132r, and front and rear gear position sensors 133f and 133r. In this embodiment, adjustment controller 130b adjusts the position of front derailleur 97f in a manner discussed below. Return controller 130c returns front derailleur 97f to a position it had prior to movement by adjustment controller 130b under conditions described below. Control unit 130 also displays speed, gear positions, and running distance on LCD 135 based on signals received from speed sensor 122 and gear position sensors 133f and 133r.

Figure 7:
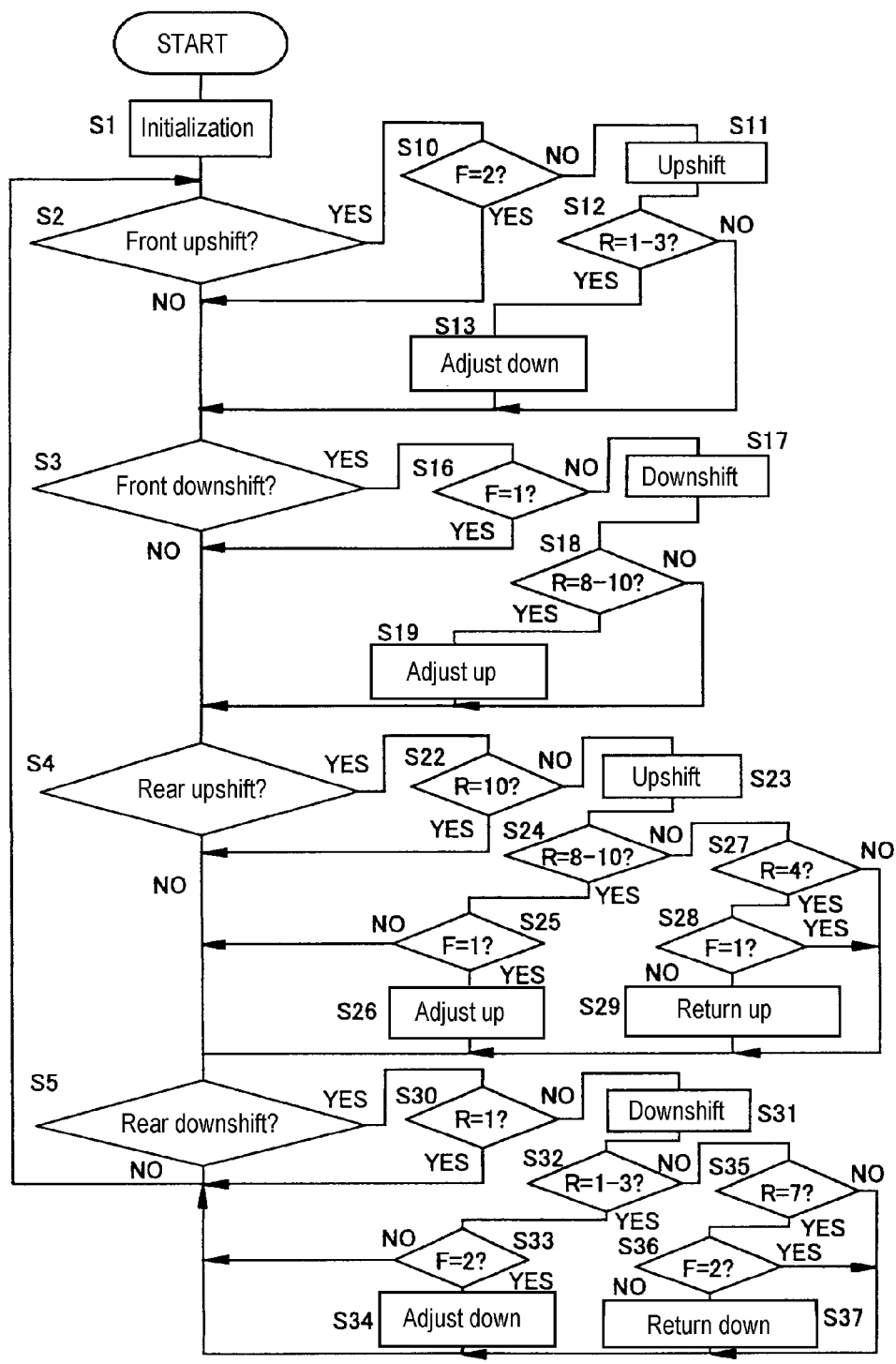
FIG. 7 is a flow chart of a particular embodiment of the operation of the derailleur control apparatus.

FIG. 7 is a flow chart of a particular embodiment of the operation of control unit 130. Initialization is carried out in a step S1 when power is supplied to control unit 130. In this step, various flags and variables are reset. It is then determined in a step S2 whether or not a front upshift switch 131f has been turned on as a result of a switch lever 125 in front shift control device 120f or 121f rotating from position P0 to position P1. If so, it is then determined in a step S10 whether or not front derailleur 97f currently is at the operating position for sprocket F2 based on signals from front gear position sensor 133f. If so, then no further upshifting is possible, the upshift request is ignored, and processing continues in a step S3. Otherwise, control unit 130 provides a signal so that front derailleur 97f switches chain 95 from sprocket F1 to sprocket F2 in step S11.

It is then determined in a step S12 whether or not rear derailleur 97r currently is at the operating position for one of sprockets R1-R3 based on signals from rear gear position sensor 133r. If not, then chain 95 is not at a very high incline relative to front sprocket F2, it is assumed that fine tuning of the position of front derailleur 97f is not required, and processing simply continues at step S3. On the other hand, if rear derailleur 97r currently is at the operating position for one of sprockets R1-R3, then chain 95 is at a relatively high incline relative to front sprocket F2, which may cause undesirable contact between chain 95 and the chain guide of front derailleur 97f, and it is assumed that fine tuning of the position of front derailleur 97f is in order. Such fine tuning is performed in a step S13, and it comprises moving front derailleur 97f laterally inward by a distance less than the distance between front sprockets F1 and F2. More specifically, front derailleur 97f may be moved laterally inward a small distance, e.g., from approximately 0.5 mm to approximately 2 mm (or more or less, depending upon the application), preferably 1 mm.

In any event, it is then determined in step S3 whether or not a front downshift switch 132f has been turned on as a result of a switch lever 125 in front shift control device 120f or 121f rotating from position P0 to position P2. If so, it is then determined in a step S16 whether or not front derailleur 97f currently is at the operating position for sprocket F1. If so, then no further downshifting is possible, the downshift request is ignored, and processing continues in a step S4. Otherwise, control unit 130 provides a signal so that front derailleur 97f switches chain 95 from sprocket F2 to sprocket F1 in a step S17.

It is then determined in a step S18 whether or not rear derailleur 97r currently is at the operating position for one of sprockets R8-R10. If not, then chain 95 is not at a very high incline relative to front sprocket F1, it is assumed that fine tuning of the position of front derailleur 97f is not required, and processing simply continues at step S4. On the other hand, if rear derailleur 97r currently is at the operating position for one of sprockets R8-R10, then chain 95 is at a relatively high incline relative to front sprocket F1, which may cause undesirable contact between chain 95 and the chain guide of front derailleur 97f, and it is assumed that fine tuning of the position of front derailleur 97f is in order. Such fine tuning is performed in a step S19, and it comprises moving front derailleur 97f laterally outward by a distance such as the distance noted above for step S13.

In any event, it is then determined in step S4 whether or not a rear upshift switch 131r has been turned on as a result of a switch lever 125 in rear shift control device 120r or 121r rotating from position P0 to position P1. If so, it is then determined in a step S22 whether or not rear derailleur 97r currently is at the operating position for sprocket R10 based on signals from rear gear position sensor 133r. If so, then no further upshifting is possible, the upshift request is ignored, and processing continues in a step S5. Otherwise, control unit 130 provides a signal so that rear derailleur 97r switches chain 95 to the next higher rear sprocket in a step S23.

It now must be determined whether or not the rear upshift has caused chain 95 to be at a relatively high incline, which would be the case if front derailleur 97f currently is at the operating position for sprocket F1 and rear derailleur 97r currently is at the operating position for one of sprockets R8-R10. Accordingly, it is determined in a step S24 whether or not rear derailleur 97r currently is at the operating position for one of sprockets R8-R10. If so, it is then determined in a step S25 whether or not front derailleur 97f currently is at the operating position for sprocket F1. If so, then chain 95 currently is at a relatively high incline relative to front sprocket F1, and it is assumed that fine tuning of the position of front derailleur 97f is in order. Such fine tuning is performed in a step S26 by moving front derailleur 97f laterally outward by a distance such as the distance noted above for step S13. Processing then continues at step S5. On the other hand, if front derailleur 97f is not positioned at sprocket F1, then chain 95 currently is engaging front sprocket F2, it is assumed that fine tuning of the position of front derailleur 97f is not required, and processing simply continues at step S5.

If it is determined in step S24 that rear derailleur 97r currently is not at the operating position for one of sprockets R8-R10, it now must be determined whether or not the rear upshift eliminated a previously high incline of chain 95, which would be the case if front derailleur 97f currently is at the operating position for sprocket F2 and rear derailleur 97r previously was at the operating position for any one of sprockets R1-R3. Accordingly, it is determined in a step S27 whether or not rear derailleur 97r currently is at the operating position for sprocket R4. If so, it is then determined in a step S28 whether or not front derailleur 97f currently is at the operating position for sprocket F1. If not, then front derailleur 97f currently is at the operating position for sprocket F2, rear derailleur 97r previously was at the operating position for sprocket R3, and chain 95 previously was at a relatively high incline relative to front sprocket F2. It also is assumed that front derailleur 97f previously was adjusted to accommodate that high incline, but now such adjustment no longer is necessary. Accordingly, return controller 130c cancels the previous adjustment by moving front derailleur 97f laterally outwardly to the unadjusted operating position for sprocket F2, and processing continues at step S5. On the other hand, if it is determined in step S27 that rear derailleur 97r currently is not positioned at sprocket R4, or if it is determined that front derailleur 97f currently is positioned at sprocket F1, then no further action is required, so processing simply continues at step S5.

It is determined in step S5 whether or not a rear downshift switch 132r has been turned on as a result of a switch lever 125 in rear shift control device 120r or 121r rotating from position P0 to position P2. If so, it is then determined in a step S30 whether or not rear derailleur 97r currently is at the operating position for sprocket R1. If so, then no further downshifting is possible, the downshift request is ignored, and processing continues at step S2. Otherwise, control unit 130 provides a signal so that rear derailleur 97r switches chain 95 to the next lower rear sprocket in a step S31.

It now must be determined whether or not the rear downshift has caused chain 95 to be at a relatively high incline, which would be the case if front derailleur 97f currently is at the operating position for sprocket F2 and rear derailleur 97r currently is at the operating position for one of sprockets R1-R3. Accordingly, it is determined in a step S32 whether or not rear derailleur 97r currently is at the operating position for one of sprockets R1-R3. If so, it is then determined in a step S33 whether or not front derailleur 97f currently is at the operating position for sprocket F2. If so, then chain 95 currently is at a relatively high incline relative to front sprocket F2, and it is assumed that fine tuning of the position of front derailleur 97f is in order. Such fine tuning is performed in a step S34 by moving front derailleur 97f laterally inward by a distance such as the distance noted above for step S13. Processing then continues at step S2. On the other hand, if front derailleur 97f is not positioned at sprocket F2, then chain 95 currently is engaging sprocket F1, it is assumed that fine tuning of the position of front derailleur 97f is not required, and processing simply continues at step S2.

If it is determined in step S32 that rear derailleur 97r currently is not at the operating position for one of sprockets R1-R3, it now must be determined whether or not the rear downshift eliminated a previously high incline of chain 95, which would be the case if front derailleur 97f currently is at the operating position for sprocket F1 and rear derailleur 97r previously was at the operating position for any one of sprockets R8-R10. Accordingly, it is determined in a step S35 whether or not rear derailleur 97r currently is at the operating position for sprocket R7. If so, it is then determined in a step S36 whether or not front derailleur 97f currently is at the operating position for sprocket F2. If not, then front derailleur 97f currently is at the operating position for sprocket F1, rear derailleur 97r previously was at the operating position for sprocket R8, and chain 95 previously was at a relatively high incline relative to front sprocket F1. It also is assumed that front derailleur 97f previously was adjusted to accommodate that high incline, but now such adjustment no longer is necessary. Accordingly, return controller 130c cancels the previous adjustment by moving front derailleur 97f laterally inwardly to the unadjusted operating position for sprocket F1, and processing continues at step S2. On the other hand, if it is determined in step S35 that rear derailleur 97r currently is not positioned at sprocket R7, or if it is determined that front derailleur 97f currently is positioned at sprocket F2, then no further action is required, so processing simply continues at step S2.

Figure 8:
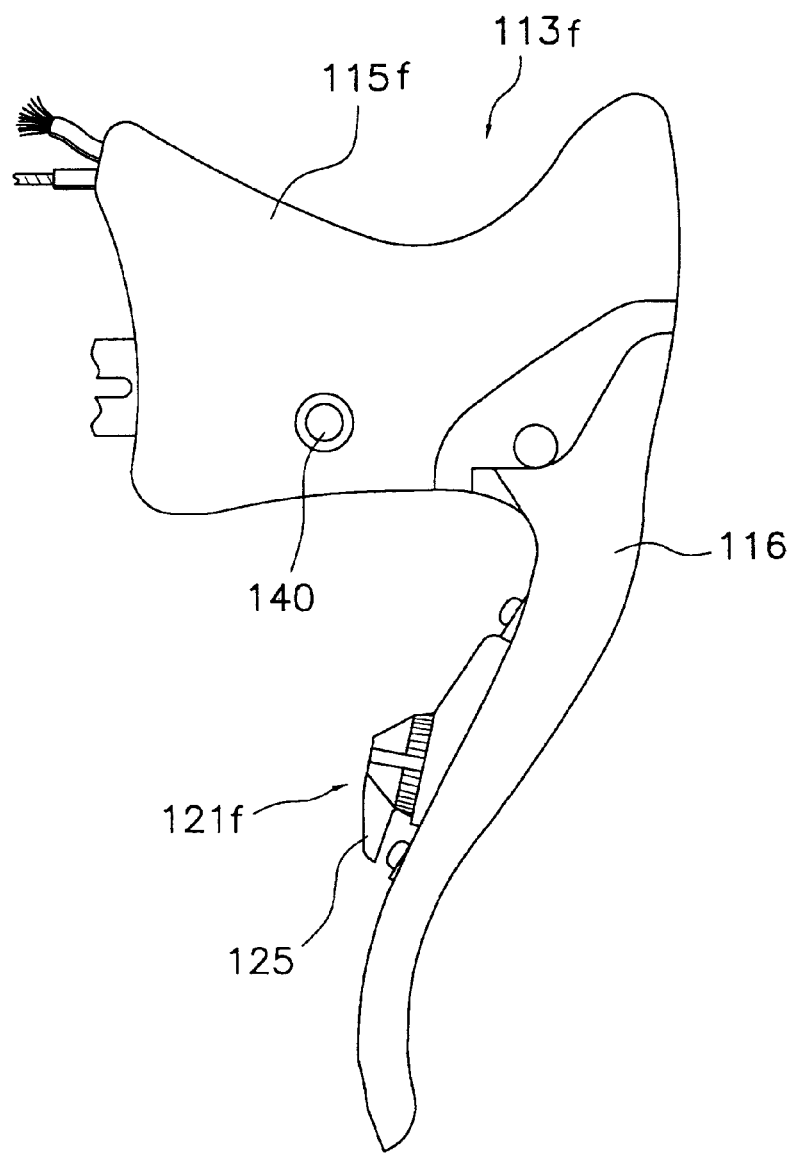
FIG. 8 is a side view of another embodiment of a front brake lever assembly.
Figure 9:
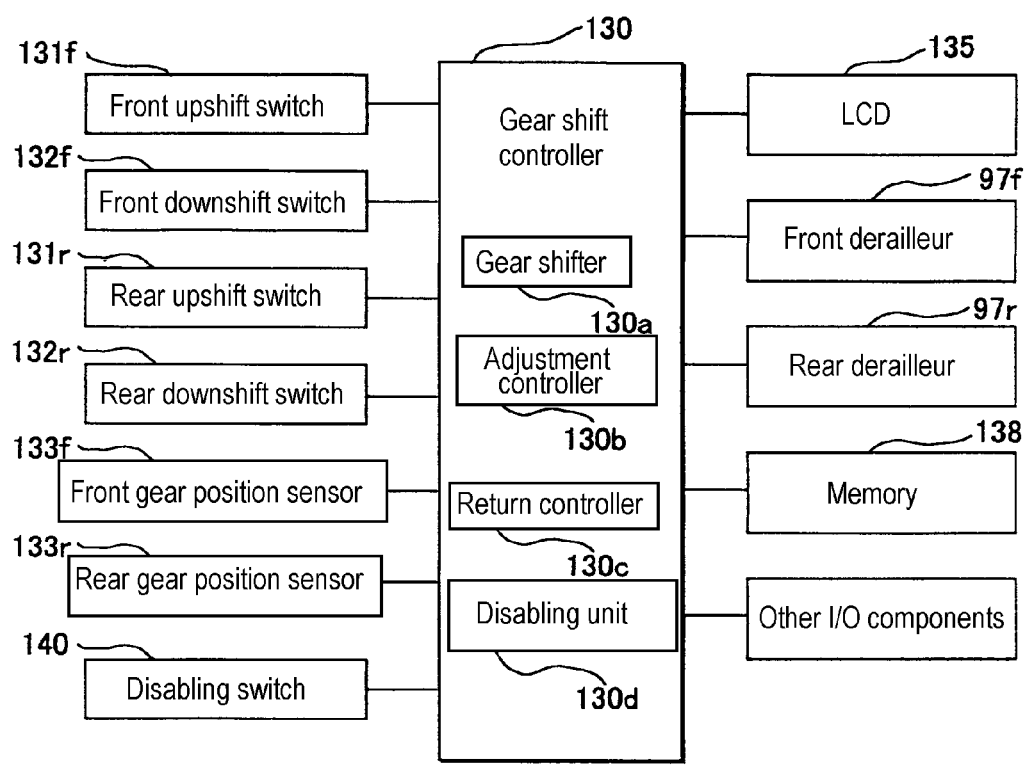
FIG. 9 is a schematic block diagram of a particular embodiment of a derailleur control apparatus used with the front brake lever assembly shown in FIG. 8.

FIG. 8 is a side view of another embodiment of front brake lever assembly 113f, and FIG. 9 is a schematic block diagram of a particular embodiment of a derailleur control apparatus used with front brake lever assembly 113f shown in FIG. 8. In this embodiment, a manually operated disabling switch 140 is mounted to brake bracket 115f, and disabling switch 140 provides signals to a disabling unit 130d in control unit 130 so that disabling unit 130d can selectively enable and disable the operation of adjustment controller 130a. That may be desirable when the number of rear sprockets is reduced, for example. Disabling the operation of adjustment controller 130b reduces power consumption and unnecessary wear on the components.

In this embodiment, disabling switch 140 comprises an on/off push button such that disabling unit 130d disables the operation of adjustment controller 130b when disabling switch provides an "on" signal and correspondingly enables the operation of adjustment controller 130b when disabling switch 140 provides an "off" signal. The other components shown in FIGS. 8 and 9 are the same as those disclosed for the first embodiment and will not be described further.

Figure 10:
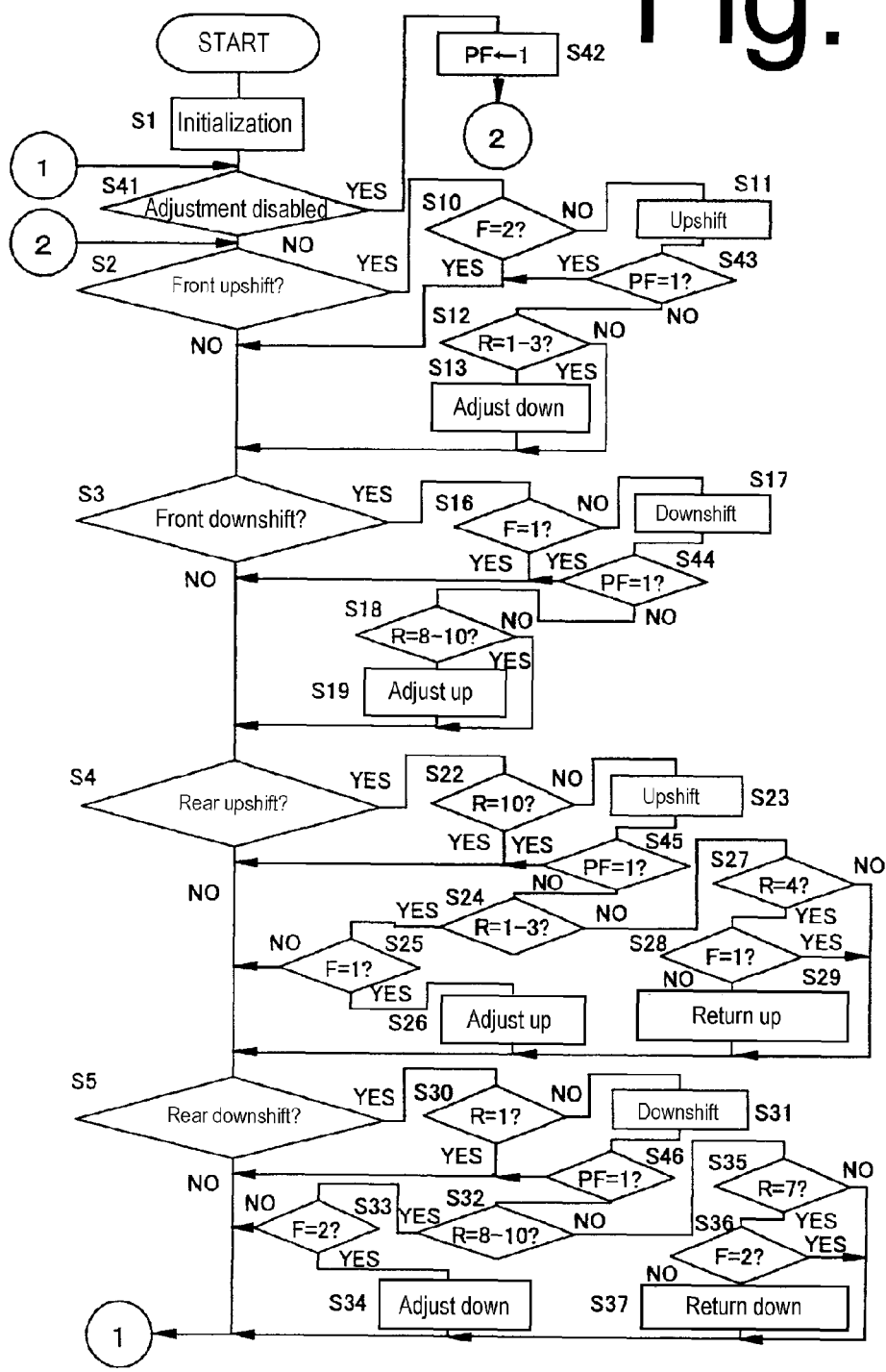
FIG. 10 is a flow chart of a particular embodiment of the operation of the derailleur control apparatus shown in FIG. 9.

FIG. 10 is a flow chart of a particular embodiment of the operation of the derailleur control apparatus shown in FIG. 9. The operation is the same as that show in FIG. 7 except for the following differences.

After initialization is performed in step S1, it is determined in a step S41 whether or not disabling switch 140 is providing an "on" signal, thus indicating a desire to disable the operation of adjustment controller 130b. If so, then a disabled flag PF is turned on (set to one) in a step S42. The disabled flag PF is reset during the initialization performed in step S1 and at any time when disabling switch 140 is turned off. In any event, it is then determined in step S2 whether or not a front upshift switch 131f has been turned on as a result of a switch lever 125 in front shift control device 120f or 121f rotating from position P0 to position P1. If so, it is then determined in step S10 whether or not front derailleur 97f currently is at the operating position for sprocket F2 based on signals from front gear position sensor 133f. If so, then no further upshifting is possible, the upshift request is ignored, and processing continues at step S3. Otherwise, control unit 130 provides a signal so that front derailleur 97f switches chain 95 from sprocket F1 to sprocket F2 in step S11.

It is then determined in a step S43 whether or not disabled flag PF is turned on. If so, then the adjustment process is bypassed, and processing simply continues at step S3. Otherwise, adjustment processing continues at step S12 as in the first embodiment.

In any event, it is then determined in step S3 whether or not a front downshift switch 132f has been turned on as a result of a switch lever 125 in front shift control device 120f or 121f rotating from position P0 to position P2. If so, it is then determined in step S16 whether or not front derailleur 97f currently is at the operating position for sprocket F1. If so, then no further downshifting is possible, the downshift request is ignored, and processing continues at step S4. Otherwise, control unit 130 provides a signal so that front derailleur 97f switches chain 95 from sprocket F2 to sprocket F1 in step S17.

It is then determined in a step S44 whether or not disabled flag PF is turned on. If so, then the adjustment process is bypassed, and processing simply continues at step S4. Otherwise, adjustment processing continues at step S18 as in the first embodiment.

In any event, it is then determined in step S4 whether or not a rear upshift switch 131r has been turned on as a result of a switch lever 125 in rear shift control device 120r or 121r rotating from position P0 to position P1. If so, it is then determined in step S22 whether or not rear derailleur 97r currently is at the operating position for sprocket R10. If so, then no further upshifting is possible, the upshift request is ignored, and processing continues at step S5. Otherwise, control unit 130 provides a signal so that rear derailleur 97r switches chain 95 to the next higher rear sprocket in step S23.

It is then determined in a step S45 whether or not disabled flag PF is turned on. If so, then the adjustment process is bypassed, and processing simply continues at step S5. Otherwise, adjustment processing continues at step S24 as in the first embodiment.

In any event, it is determined in step S5 whether or not a rear downshift switch 132r has been turned on as a result of a switch lever 125 in rear shift control device 120r or 121r rotating from position P0 to position P2. If so, it is then determined in step S30 whether or not rear derailleur 97r currently is at the operating position for sprocket R1. If so, then no further downshifting is possible, the downshift request is ignored, and processing continues at step S2. Otherwise, control unit 130 provides a signal so that rear derailleur 97r switches chain 95 to the next lower rear sprocket in step S31.

It is then determined in a step S46 whether or not disabled flag PF is turned on. If so, then the adjustment process is bypassed, and processing simply continues at step S41. Otherwise, adjustment processing continues at step S32 as in the first embodiment.

Figure 11:
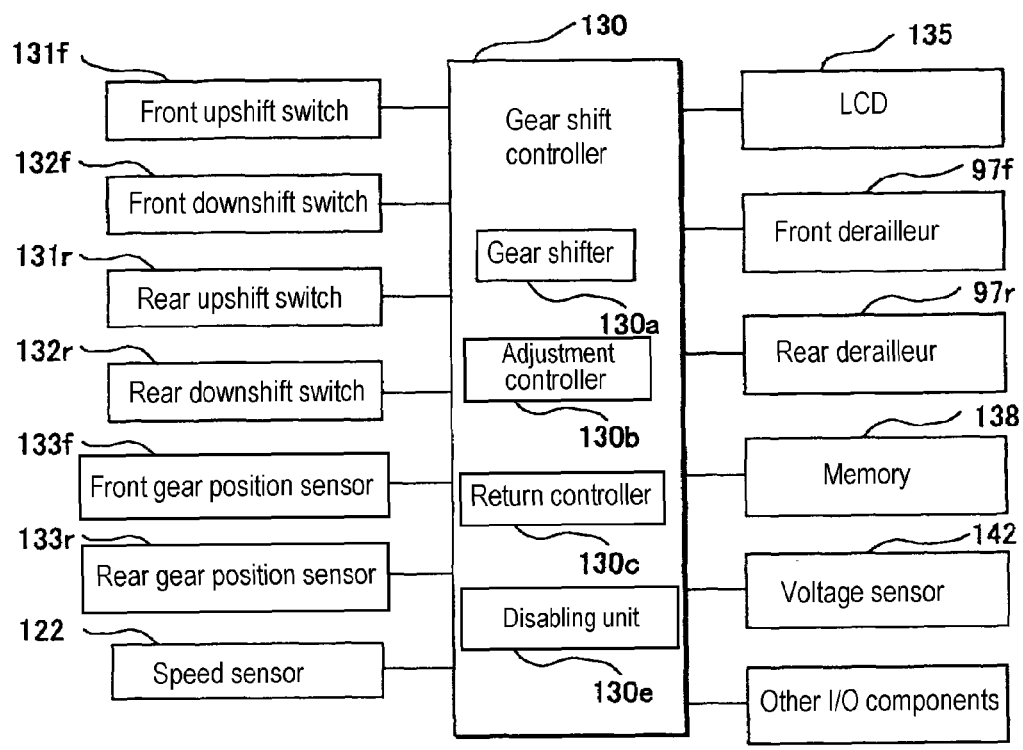
FIG. 11 is a schematic block diagram of another embodiment of a derailleur control apparatus.

FIG. 11 is a schematic block diagram of another embodiment of a derailleur control apparatus. In this embodiment, a voltage sensor 142 provides signals to a disabling unit 130e in control unit 130 so that disabling unit 130e can selectively enable and disable the operation of adjustment controller 130a when a power supply voltage, for example, falls below a desired value to avoid further drain on the power supply and possible malfunction of the components.

Figure 12:
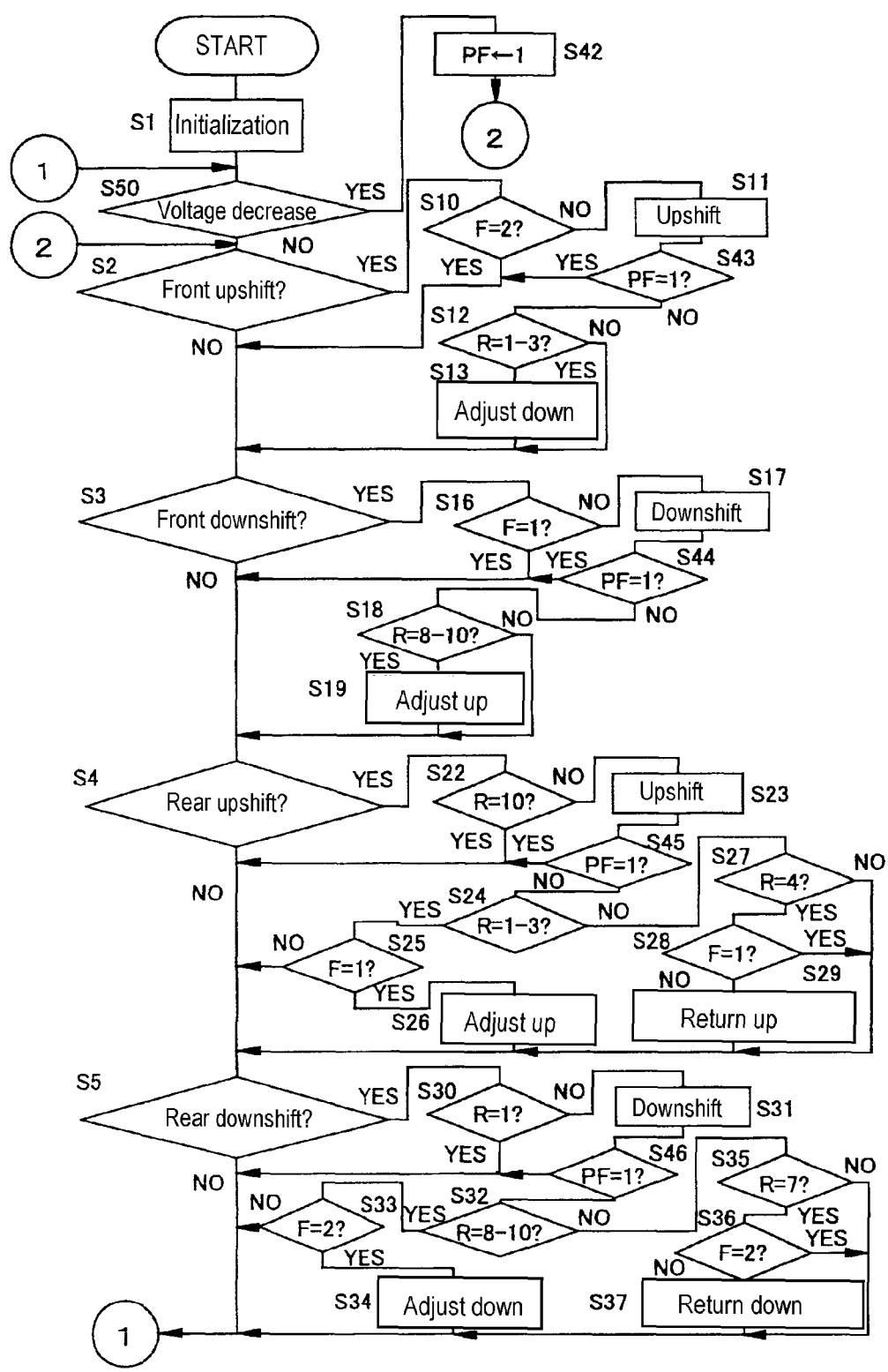
FIG. 12 is a flow chart of a particular embodiment of the operation of the derailleur control apparatus shown in FIG. 11.

FIG. 12 is a flow chart of a particular embodiment of the operation of the derailleur control apparatus shown in FIG. 11. The operation is the same as that show in FIG. 10 except for the following differences.

After initialization is performed in step S1, it is determined in a step S40 whether or not voltage sensed by voltage sensor 142 has fallen below a selected threshold value (e.g., 50% of a fully charged state). If so, then a disabled flag PF is turned on (set to one) in a step S42. Processing then continues in the same manner as that shown in FIG. 10.

Figure 13:
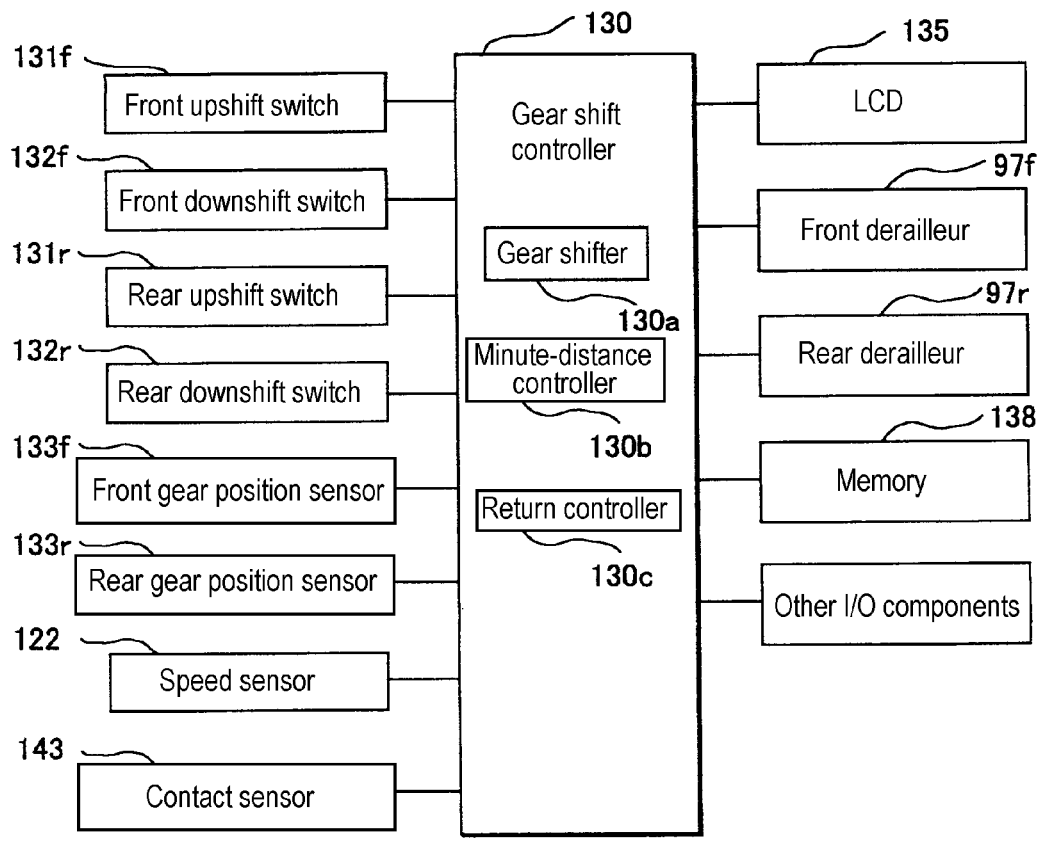
FIG. 13 is a schematic block diagram of another embodiment of a derailleur control apparatus.

FIG. 13 is a schematic block diagram of another embodiment of a derailleur control apparatus. In this embodiment, a contact sensor 143 provides signals to control unit 130 so that control unit 130 may determine whether or not to perform adjustment processing. In this embodiment, contact sensor 143 may comprise a vibration sensor that senses unusual vibration of front derailleur 97f. Contact sensor 143 also may comprise a sound wave sensor that senses unusual noise that may arise from contact between chain 95 and front derailleur 97f. The other components shown in FIG. 13 are the same as those disclosed for the first embodiment and will not be described further.

Figure 14:
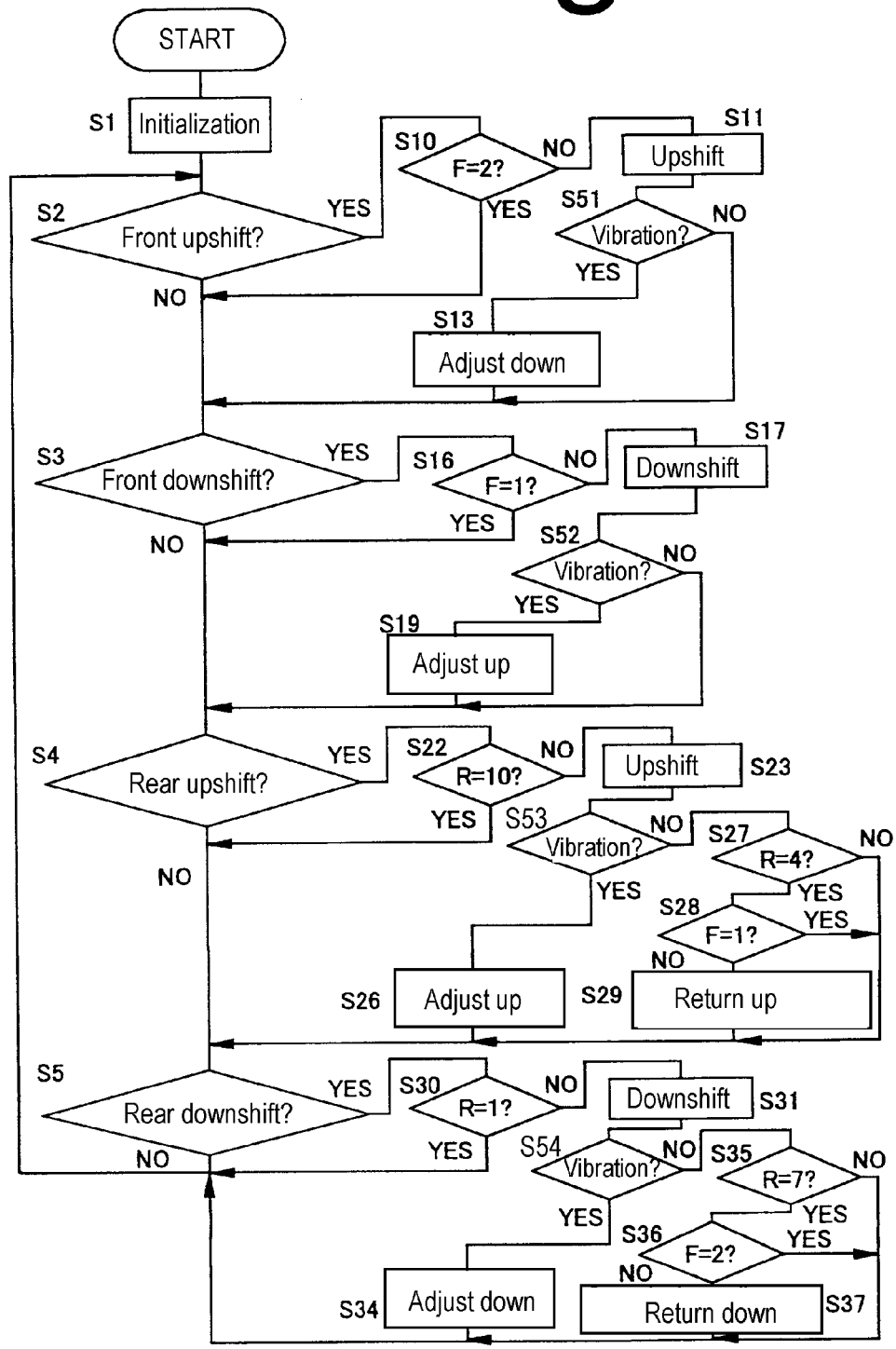
FIG. 14 is a flow chart of a particular embodiment of the operation of the derailleur control apparatus shown in FIG. 13.

FIG. 14 is a flow chart of a particular embodiment of the operation of the derailleur control apparatus shown in FIG. 13. The operation is the same as that show in FIG. 7 except for the following differences.

After initialization is performed in step S1, it is then determined in step S2 whether or not a front upshift switch 131f has been turned on as a result of a switch lever 125 in front shift control device 120f or 121f rotating from position P0 to position P1. If so, it is then determined in step S10 whether or not front derailleur 97f currently is at the operating position for sprocket F2. If so, then no further upshifting is possible, the upshift request is ignored, and processing continues at step S3. Otherwise, control unit 130 provides a signal so that front derailleur 97f switches chain 95 from sprocket F1 to sprocket F2 in step S11.

It is then determined in a step S51 whether or not undesirable contact between chain 95 and front derailleur 97f is being sensed by contact sensor 143. If so, then front derailleur 97*f* is adjusted laterally inward in step S13 as in the first embodiment.

In any event, it is then determined in step S3 whether or not a front downshift switch 132*f* has been turned on as a result of a switch lever 125 in front shift control device 120*f* or 121*f* rotating from position P0 to position P2. If so, it is then determined in a step S16 whether or not front derailleur 97*f* currently is at the operating position for sprocket F1. If so, then no further downshifting is possible, the downshift request is ignored, and processing continues at step S4. Otherwise, control unit 130 provides a signal so that front derailleur 97*f* switches chain 95 from sprocket F2 to sprocket F1 in step 17.

It is then determined in a step S52 whether or not undesirable contact between chain 95 and front derailleur 97*f* is being sensed by contact sensor 143. If so, then front derailleur 97*f* is adjusted laterally outward in step S19 as in the first embodiment.

In any event, it is then determined in step S4 whether or not a rear upshift switch 131*r* has been turned on as a result of a switch lever 125 in rear shift control device 120*r* or 121*r* rotating from position P0 to position P1. If so, it is then determined in a step S22 whether or not rear derailleur 97*r* is at the operating position for sprocket R10. If so, then no further upshifting is possible, the upshift request is ignored, and processing continues at step S5. Otherwise, control unit 130 provides a signal so that rear derailleur 97*r* switches chain 95 to the next higher rear sprocket in step S23.

It is then determined in a step S53 whether or not undesirable contact between chain 95 and front derailleur 97*f* is being sensed by contact sensor 143. If so, then front derailleur 97*f* is adjusted laterally outward in step S26 as in the first embodiment. Otherwise, processing continues at step S27 as in the first embodiment.

In any event, it is determined in step S5 whether or not a rear downshift switch 132*r* has been turned on as a result of a switch lever 125 in rear shift control device 120*r* or 121*r* rotating from position P0 to position P2. If so, it is then determined in a step S30 whether or not rear derailleur 97*r* currently is at the operating position for sprocket R1. If so, then no further downshifting is possible, the downshift request is ignored, and processing continues at step S2. Otherwise, control unit 130 provides a signal so that rear derailleur 97*r* switches chain 95 to the next lower rear sprocket in step S31.

It is then determined in a step S54 whether or not undesirable contact between chain 95 and front derailleur 97*f* is being sensed by contact sensor 143. If so, then front derailleur 97*f* is adjusted laterally inward in step S34 as in the first embodiment. Otherwise, processing continues at step S35 as in the first embodiment.

While the above is a description of various embodiments of inventive features, further modifications may be employed without departing from the spirit and scope of the present invention. For example, in the embodiment described in FIG. 7, a previous adjustment of front derailleur 97*f* was canceled whenever rear derailleur 97*r* shifted one gear up from rear sprocket R3 or one gear down from rear sprocket R8. However, such cancellation may occur when rear derailleur 97*r* shifts even more one gear up or down than that disclosed in FIG. 7. In that case, it would be determined in step S27 in FIG. 7 whether or not rear derailleur 97*r* currently is in the operating position for sprocket R5, and it would be determined in step S35 whether or not rear derailleur 97*r* currently is in the operating position for sprocket R6. That further reduces power consumption caused by frequent operation of front derailleur 97*f*.

In the above embodiments, adjustment of front derailleur 97*f* occurred at the same time gear shifting occurred. However, it is possible to delay the adjustment operation until after a predetermined time interval from the detection of a questionable sprocket combination, or after a predetermined crank rotation interval from the detection of the questionable sprocket combination. If desired, such delays may be applied only to situations where the front and/or rear derailleur takes more time to complete the shifting operation, such as when the front derailleur performs an upshift operation. Such time delays increase the probability that the gear shift operation has in fact completed and front derailleur 97*f* may be adjusted with more precision.

While the above embodiments included only two front sprockets F1 and F2, a three-stage front sprocket assembly 99*f* comprising front sprockets F1-F3 may be employed. In this case, adjustment processing may be disabled when front derailleur 97*f* is in the operating position for sprocket F2.

While adjustment processing was performed when front derailleur 97*f* was in the operating position for front sprocket F1 and rear derailleur 97*r* was in the operating position for any one of rear sprockets R8-R10, or when front derailleur 97*f* was in the operating position for front sprocket F2 and rear derailleur 97*r* was in the operating position for any one of rear sprockets R1-R3, adjustment may be accomplished for many sprocket combinations, such as when front derailleur 97*f* is in the operating position for front sprocket F1 and rear derailleur 97*r* is in the operating position only for rear sprocket R10, or when front derailleur 97*f* is in the operating position for front sprocket F2 and rear derailleur 97*r* is in the operating position only for rear sprocket R1. Similarly, adjustment may be accomplished when front derailleur 97*f* is in the operating position for front sprocket F1 and rear derailleur 97*r* is in the operating position only for rear sprockets R9 and R10, or when front derailleur 97*f* is in the operating position for front sprocket F2 and rear derailleur 97*r* is in the operating position only for rear sprockets R1 and R2.

While the described embodiments were applied to a road bicycle, the bicycle may have any configuration. Also, while the above embodiments described an electronically controlled rear derailleur 97*r*, a manually controlled rear derailleur also may be used.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature that is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

What is claimed is:

1. A computer-controlled bicycle transmission control apparatus for controlling the operation of an electrically-controlled front derailleur and an electrically-controlled rear derailleur, wherein the apparatus comprises:

a control unit that provides a first signal that operates the front derailleur by a front gear shift distance defined as the distance from an origin front sprocket to a destination front sprocket and that provides a second signal that operates the rear derailleur by a rear gear shift distance defined as the distance from an origin rear sprocket to a destination rear sprocket;

wherein the control unit receives a condition signal that indicates a condition resulting from a gear shift operation of at least one of the front derailleur and the rear derailleur; and an adjustment controller that moves the front derailleur by an adjustment distance less than the front gear shift distance in response to the condition signal resulting from a gear shift operation of the front derailleur and stops the front derailleur at the adjustment distance less than the front gear shift distance so that the front derailleur is maintained during riding in a position offset from the front gear shift distance, and that moves the front derailleur by an adjustment distance less than the front gear shift distance in response to the condition signal resulting from a gear shift operation of the rear derailleur and stops the front derailleur at the adjustment distance less than the front gear shift distance so that the front derailleur is maintained during riding in a position offset from the front gear shift distance.

2. The apparatus according to claim 1 wherein the condition signal comprises a chain contact signal that indicates contact between a chain controlled by the first derailleur and another bicycle component.

3. The apparatus according to claim 1 further comprising a return controller that returns the front derailleur to a position it had prior to movement by the adjustment controller.

4. The apparatus according to claim 1 further comprising a disabling unit that selectively disables operation of the adjustment controller.

5. The apparatus according to claim 4 wherein the disabling unit further comprises a manually operated disabling switch, wherein the disabling unit disables the operation of the adjustment controller in response to signals from the disabling switch.

6. The apparatus according to claim 5 wherein the disabling switch is mounted in a brake lever assembly.

7. The apparatus according to claim 4 further comprising a voltage sensor that senses a voltage of a power supply, wherein the disabling unit disables the operation of the adjustment controller in response to signals from the voltage sensor.

8. The apparatus according to claim 1 wherein the adjustment controller moves the front derailleur the adjustment distance after a predetermined time interval from receipt of the condition signal.

9. The apparatus according to claim 1 wherein the adjustment controller moves the front derailleur the adjustment distance after a predetermined crank rotation interval from receipt of the condition signal.

10. The apparatus according to claim 1 wherein the condition signal comprises a rear derailleur position signal indicating a position of the rear derailleur.

11. The apparatus according to claim 1 wherein the condition signal comprises a front derailleur position signal indicating a position of the front derailleur.

12. The apparatus according to claim 11 wherein the condition signal comprises a front derailleur position signal indicating a position of the front derailleur and a rear derailleur position signal indicating a position of the rear derailleur, and wherein the adjustment controller moves the front derailleur the adjustment distance in response to a combination of the front derailleur position signal and the rear derailleur position signal.

13. The apparatus according to claim 12 wherein the adjustment controller moves the front derailleur by the adjustment distance when the front derailleur position signal indicates that the front derailleur is located at a laterally innermost front sprocket and the rear derailleur position signal indicates that the rear derailleur is located at a laterally outermost rear sprocket.

14. The apparatus according to claim 13 wherein the adjustment controller moves the front derailleur by the adjustment distance when the rear derailleur position signal indicates that the rear derailleur is located at one of the M outermost rear sprockets, wherein M is an integer.

15. The apparatus according to claim 14 wherein M is less than or equal to three.

16. The apparatus according to claim 12 wherein the adjustment controller moves the front derailleur by the adjustment distance when the front derailleur position signal indicates that the front derailleur is located at a laterally outermost front sprocket and the rear derailleur position signal indicates that the rear derailleur is located at a laterally innermost rear sprocket.

17. The apparatus according to claim 16 wherein the adjustment controller moves the front derailleur by the adjustment distance when the second position signal indicates that the rear derailleur is located at one of the M innermost rear sprockets, where M is an integer.

18. The apparatus according to claim 17 wherein M is less than or equal to three.

19. The apparatus according to claim 12 further comprising a return controller that returns the front derailleur to a position it had prior to movement by the adjustment controller.

20. The apparatus according to claim 19 wherein the return controller returns the front derailleur to the position it had prior to movement by the adjustment controller when the front derailleur position signal and the rear derailleur position signal do not indicate a predetermined combination.

21. A method for computer-controlling the operation of a front derailleur and a rear derailleur, wherein the method comprises the steps of:

providing at least one of a first signal that operates the front derailleur by a front gear shift distance defined as the distance from an origin front sprocket to a destination front sprocket and a second signal that operates the rear derailleur by a rear gear shift distance defined as the distance from an origin rear sprocket to a destination rear sprocket;

receiving, by a control unit, a condition signal that indicates a condition resulting from a gear shift operation of at least one of the front derailleur and the rear derailleur;

moving the front derailleur by an adjustment distance less than the front gear shift distance in response to the condition signal resulting from the gear shift operation of the at least one of the front derailleur and the rear derailleur; and stopping the front derailleur at the adjustment distance less than the front gear shift distance so that the front derailleur is maintained during riding in a position offset from the front gear shift distance.

22. The apparatus according to claim 1 wherein the adjustment controller automatically moves the front derailleur by the adjustment distance in response to the condition signal resulting from a gear shift operation of the rear derailleur and automatically stops the front derailleur at the adjustment distance.

23. The apparatus according to claim 3 wherein the return controller, in response to the condition signal resulting from a gear shift operation of the rear derailleur, automatically returns the front derailleur to a position the front derailleur had prior to movement by the adjustment controller.

24. The apparatus according to claim 1 wherein the adjustment controller moves the front derailleur toward the origin front sprocket by an adjustment distance less than the front gear shift distance so that the front derailleur is maintained during riding in a position from the origin front sprocket by a distance less than the front gear shift distance.

25. The apparatus according to claim 24 wherein the control unit provides the first signal that operates the front derailleur by the front gear shift distance from the origin front sprocket to the destination front sprocket in response to receiving an upshift request signal or a downshift request signal.

26. The apparatus according to claim 25 wherein the front derailleur is maintained during riding in the position offset from the front gear shift distance until the control unit receives a subsequent upshift request signal or a subsequent downshift request signal.

27. A computer-controlled bicycle transmission control apparatus for controlling the operation of a front derailleur and a rear derailleur, wherein the apparatus comprises:
 a control unit that provides a first signal that operates the front derailleur by a front gear shift distance defined as the distance from an origin front sprocket to a destination front sprocket in response to receiving a front upshift request signal or a front downshift request signal and that provides a second signal that operates the rear derailleur by a rear gear shift distance defined as the distance from an origin rear sprocket to a destination rear sprocket in response to receiving a rear upshift request signal or a rear downshift request signal;
 wherein the control unit receives a condition signal that indicates a condition resulting from a gear shift operation of at least one of the front derailleur and the rear derailleur; and
 an adjustment controller that, in response to the condition signal resulting from the gear shift operation of the at least one of the front derailleur and the rear derailleur and after the control unit provides the first signal that operates the front derailleur by the front gear shift distance in response to receiving the front upshift request signal or the front downshift request signal or the second signal that operates the rear derailleur by the rear gear shift distance in response to receiving the rear upshift request signal or the rear downshift request signal, moves the front derailleur by an adjustment distance less than the front gear shift distance, and stops the front derailleur at the adjustment distance less than the front gear shift distance so that the front derailleur is maintained during riding between the first origin front sprocket and the destination front sprocket at a distance from the origin front sprocket less than the front gear shift distance until the control unit receives a subsequent front upshift request signal, a subsequent front downshift request signal, a subsequent rear upshift request signal, or a subsequent rear downshift request signal.

* * * * *